US012018803B2

(12) United States Patent
Li et al.

(10) Patent No.: US 12,018,803 B2
(45) Date of Patent: Jun. 25, 2024

(54) PROJECTION DEVICE AND PROJECTION SYSTEM

(71) Applicant: SAVANT TECHNOLOGIES LLC, East Cleveland, OH (US)

(72) Inventors: Bin Li, Shanghai (CN); Kun Xiao, Shanghai (CN); Jie Gao, Shanghai (CN); Hai Huang, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/072,978

(22) Filed: Dec. 1, 2022

(65) Prior Publication Data

US 2023/0235867 A1 Jul. 27, 2023

(30) Foreign Application Priority Data

Dec. 22, 2021 (CN) ......................... 202111581361.6

(51) Int. Cl.

| | |
|---|---|
| ***F21S 10/00*** | (2006.01) |
| ***F21S 10/06*** | (2006.01) |
| ***F21V 14/00*** | (2018.01) |
| ***F21V 14/04*** | (2006.01) |
| ***F21V 14/06*** | (2006.01) |
| *F21W 121/00* | (2006.01) |
| *F21Y 113/20* | (2016.01) |
| *F21Y 115/30* | (2016.01) |

(52) U.S. Cl.

CPC ............. *F21S 10/007* (2013.01); *F21S 10/06* (2013.01); *F21V 14/04* (2013.01); *F21V 14/06* (2013.01); *F21W 2121/008* (2013.01); *F21Y 2113/20* (2016.08); *F21Y 2115/30* (2016.08)

(58) Field of Classification Search

CPC ........ F21S 10/007; F21S 10/06; F21S 10/063; F21V 14/006; F21V 14/04

See application file for complete search history.

(56) References Cited

U.S. PATENT DOCUMENTS

| | | | | |
|---|---|---|---|---|
| 7,641,345 | B2 | 1/2010 | Johnson | |
| 8,057,045 | B2 | 11/2011 | Johnson | |
| 2022/0243895 | A1 * | 8/2022 | Xu ............................ | F21V 7/10 |

FOREIGN PATENT DOCUMENTS

| | | | |
|---|---|---|---|
| CN | 101276523 | A | 10/2010 |
| CN | 107859962 | A | 3/2018 |

* cited by examiner

*Primary Examiner* — Sean P Gramling
(74) *Attorney, Agent, or Firm* — WOOD IP LLC

(57) ABSTRACT

Provided is a projection device and projection system that includes a first light source which emits a first light beam, a diffraction part on which first predetermined pattern is provided, and the diffraction part diffracts at least a part of the first light beam emitted from the first light source to form first pattern corresponding to the first predetermined pattern, and a reflection part on which one or more second predetermined patterns are provided, the reflection part reflects a second light beam incident thereon to form second pattern corresponding to the one or more second predetermined patterns, and one of the first pattern and the second pattern forms projection pattern or both of the first pattern and the second pattern are superposed to form projection pattern.

9 Claims, 5 Drawing Sheets

100

PROJECTION DEVICE AND PROJECTION SYSTEM

CROSS-REFERENCE TO RELATED APPLICATIONS

This application claims the benefit of Chinese Patent Application Serial Number 202111581361.6, filed Dec. 22, 2021, which is herein incorporated by reference.

DESCRIPTION

Field of Technology

The disclosure relates to the field of projection, and in particular to a projection device and a projection system.

Background

A projection device commonly used at present, for example, an atmosphere lamp, may provide perfect choices for places such as theme parks, hotels, furniture, exhibitions, and artistic lighting, and create a required atmosphere for the life of people.

A projection device is disclosed in prior art U.S. Pat. No. 8,057,045B2, a circuit block diagram of which is shown in FIG. 1.

As shown in FIG. 1, in the projection apparatus 10, a full wave bridge rectifier and filter circuit 24 rectifies and filters an Alternating Current Input (AC INPUT) to obtain a desired Direct Current output (DC) which is fed to an LED regulator 28, a laser diode power supply 30 and a motor current control 26. Light beams from an LED 18 pass through an inner lens 32 and a rotating interference filter wheel 12 and are finally collected and redirected by an outer lens 34 to create a cloud-like effect. A motor 20 is configured to rotate the interference filter wheel 12. Light beams from a laser 16 pass through a Diffraction Optical Element (DOE) 36, and light diffracted from the DOE 36 passes through a rotating grating wheel 14 to generate bright spots because of interference of the diffracted light beams, the bright spots generated appear as stars. A motor 22 is configured to rotate the grating wheel 14. The stars are layered on the cloud-like patterns, forming a starry sky atmosphere.

However, in the prior art described above, the star/cloud effect is provided by transmission of light emitted from the light source through the interference filter wheel 12 and other parts, which causes occurring of the dispersion problem, so that an image finally presented is not clear enough. In addition, the projection apparatus in the prior art can only form the starry sky atmosphere and cannot meet the switching requirement of different atmospheres (different projection patterns).

In view of this, a projection device and a projection system that may avoid the dispersion problem, make a final presented image sufficiently clear, and enable switching among different projection patterns are desired.

SUMMARY

An embodiment of the disclosure provides a projection device and a projection system, for at least solving the problem of dispersion and incapability of switching among different projection patterns in an existing projection apparatus.

According to an aspect of the embodiment of the disclosure, there is provided a projection device, including: a first light source, which emits a first light beam; a diffraction part on which first predetermined pattern is provided, the diffraction part is capable of diffracting at least a part of the first light beam emitted from the first light source to form first pattern corresponding to the first predetermined pattern; and a reflection part on which one or more second predetermined patterns are provided, the reflection part is capable of reflecting a second light beam incident thereon to form second pattern corresponding to the one or more second predetermined patterns, and one of the first pattern and the second pattern forms projection pattern or both of the first pattern and the second pattern are superposed to form projection pattern.

In this way, the reflection part on which one or more second predetermined patterns are provided is configured to reflect the light beams to form the second pattern, thus the dispersion problem occurring when the light beams transmit through an optical component is avoided, and the formed projection pattern is clearer.

In an exemplary embodiment of the projection device, the projection device further includes a beam splitter, disposed between the first light source and the reflection part and configured to split the first light beam emitted from the first light source into a first sub light beam and a second sub light beam incident to the diffraction pat, and the diffraction part diffracts the second sub light beam to form the first pattern corresponding to the first predetermined pattern; and a beam expander, disposed between the beam splitter and the reflection part and configured to expand the first sub light beam to form the second light beam.

In this way, the beam splitter is used to split the first light beam emitted from the first light source, the beam expander is used to expand part of the sub light beam formed after splitting the first light beam to form the second light beam reflected by the reflection part, so that the number of light sources is reduced, therefore, the light beams used by the diffraction part and the reflection part of the projection device are more uniform, and the quality of the projection pattern is improved.

In an exemplary embodiment of the projection device, the projection device further includes a second light source, which emits the second light beam.

In this way, it is possible to additionally provide the reflection part with the second light source, which is the same as or different from the first light source, as desired, providing greater degree of freedom for device design.

In an exemplary embodiment of the projection device, the second light source is a coherent light source, and the one or more second predetermined patterns are holographic patterns.

In this way, illuminating the holographic patterns with the coherent light source will result in more clear and stereographic projection patterns that are finally formed.

In an exemplary embodiment of the projection device, the second light source is an incoherent light source, and the one or more second predetermined patterns are patterns formed by aluminizing on a substrate.

In this way, another arrangement form of the second light source and the second predetermined pattern are provided.

In an exemplary embodiment of the projection device, the first light source is a coherent light source, and the one or more second predetermined patterns are holographic patterns.

In this way, illuminating the holographic patterns with the coherent light source will result in more clear and stereographic projection patterns that are finally formed.

In an exemplary embodiment of the projection device, the coherent light source is laser.

In this way, a specific form of the coherent light source is provided.

In an exemplary embodiment of the projection device, the diffraction part includes a DOE.

In this way, a specific form of the diffraction part is provided. The DOE carries out diffraction by utilizing the coherent light source, so that the dispersion problem in the projection device is further avoided.

In an exemplary embodiment of the projection device, the projection device further includes a first motor, connected to the reflection part and configured to drive the reflection part to rotate, so that the second pattern rotate with the rotation of the reflection part.

In this way, the motor rotates the reflection part, so that different predetermined patterns on the reflection part may be irradiated by the second light beam, different second patterns are generated, and the finally formed projected patterns have diversity or animation effect.

In an exemplary embodiment of the projection device, the projection device further includes a second motor connected to the diffraction part and configured to drive the diffraction part to rotate.

In this way, the motor rotates the diffraction part, so that the movement of the first pattern may be controlled, and the finally formed projected pattern is more vivid.

In an exemplary embodiment of the projection device, the projection device further includes a projection lens, configured to diverge the second light beam reflected from the reflection part to form the second pattern.

In this way, the second pattern may form a size suitable for a scene in which it is applied by the projection lens.

In an exemplary embodiment of the projection device, the projection device further includes a shutter, disposed between the first light source and the diffraction part and configured to enable at least a part of the first light beam emitted from the first light source to be incident to the diffraction part at a predetermined time interval.

In this way, at least a part of the first light beam is incident to the diffraction part at a predetermined time interval through the shutter, and the effect, for example, star flickering may be formed without frequently switching on/off of the first light source.

According to another aspect of the embodiment of the application, there is provided a projection device, including: a first light source, which emits a first light beam; a diffraction part on which first predetermined pattern is provided, the diffraction part diffracts at least a part of the first light beam emitted from the first light source to form first pattern corresponding to the first predetermined pattern; a reflection part having a self-luminous dot matrix including a plurality of self-luminous dots; and a controller, configured to control the self-luminous dots in the self-luminous dot matrix, so that one or more second predetermined patterns are formed, second pattern corresponding to the one or more second predetermined patterns is formed through self-illumination of the self-luminous dots forming the one or more second predetermined patterns, and one of the first pattern and the second pattern forms projection patterns or both of the first pattern and the second pattern are superposed to form the projection pattern.

In this way, since the reflection part is a self-luminous part, no light source needs to be additionally arranged, so that the structure of the projection device is simplified, and meanwhile, the dispersion problem in the projection process is avoided. Moreover, by controlling the self-luminous dots in the reflection part, different predetermined patterns may be formed, and the diversity and flexibility of the finally formed projection pattern are further improved.

In an exemplary embodiment of the projection device, the first light source is a coherent light source.

In this way, the diffraction part carries out diffraction by utilizing the coherent light source, so that the dispersion problem in the projection device is further avoided.

In an exemplary embodiment of the projection device, the coherent light source is laser.

In this way, a specific form of the coherent light source is provided.

In an exemplary embodiment of the projection device, the diffraction part includes a DOE.

In this way, a specific form of the diffraction part is provided. The diffraction optical element carries out diffraction by utilizing the coherent light source, so that the dispersion problem in the projection device is further avoided.

In an exemplary embodiment of the projection device, the projection device further includes a first motor, connected to the reflection part and configured to drive the reflection part to rotate, so that the second pattern rotate with the rotation of the reflection part.

In this way, the motor rotates the reflection part, so that the finally formed projection pattern has a rotating animation effect.

In an exemplary embodiment of the projection device, the projection device further includes a second motor connected to the diffraction part and configured to drive the diffraction part to rotate.

In this way, the motor rotates the diffraction part, so that the movement of the first pattern may be controlled, and the finally formed projection pattern is more vivid.

In an exemplary embodiment of the projection device, the projection device further includes a projection lens, configured to diverge the light beam emitted by self-luminous dots, forming one or more second predetermined patterns, of the reflection part to form the second pattern.

In this way, the second pattern may form a size suitable for a scene in which it is applied by the projection lens.

In an exemplary embodiment of the projection device, the projection device further includes a shutter, disposed between the light source and the diffraction part and configured to enable at least a part of the first light beam emitted from the first light source to be incident to the diffraction part at a predetermined time interval.

In this way, at least a part of the first light beam is incident to the diffraction part at a predetermined time interval through the shutter, and the effect, for example, star flickering may be formed without frequent switching on/off of the light source.

According to still another aspect of the embodiment of the disclosure, there is provided a projection system, including the projection device according to the embodiments described above, the projection device being an atmosphere lamp; a housing, configured to accommodate the projection device; and control buttons, disposed on the surface of the housing and being capable of carrying out control operations on the projection device.

According to the projection system provided by the embodiment of the disclosure, the dispersion problem in the projection process may be avoided, and meanwhile, switching among the plurality of projection patterns is available, so that the finally formed projection pattern has diversity and flexibility.

BRIEF DESCRIPTION OF THE DRAWINGS

The drawings described herein serve to provide a further understanding of the disclosure and constitute a part of the disclosure, and the exemplary embodiments of the disclosure and descriptions thereof serve to explain the disclosure and are not to be construed as unduly limiting the disclosure. In the drawings.

DETAILED DESCRIPTION

In order that those skilled in the art can better understand the technical solutions of the disclosure, the technical solutions in the embodiments of the disclosure will be clearly and completely described with reference to the drawings in the embodiments of the disclosure, and obviously, the described embodiments are a part rather than all of the embodiments of the disclosure. All other embodiments obtained by those of ordinary skill in the art based on the embodiments of the disclosure without creative efforts shall fall within the protection scope of the disclosure.

It is to be noted that the terms “first,” “second,” and the like in the specification, the claims and the drawings of the disclosure are used for distinguishing between similar objects and not necessarily for describing a particular sequence or sequential order. It is to be understood that data so used may be interchanged where appropriate so that the embodiments of the disclosure described herein can be implemented in other sequences than those illustrated or described herein. In addition, the terms “comprise” and “have” and any variations thereof, are intended to cover a non-exclusive inclusion, e.g., a process, method, system, product, or device that comprises a series of steps or modules or units is not necessarily limited to those steps or modules or units expressly listed, rather, other steps or modules or units not expressly listed or inherent to such process, method, product, or device may be included.

Figure 1:
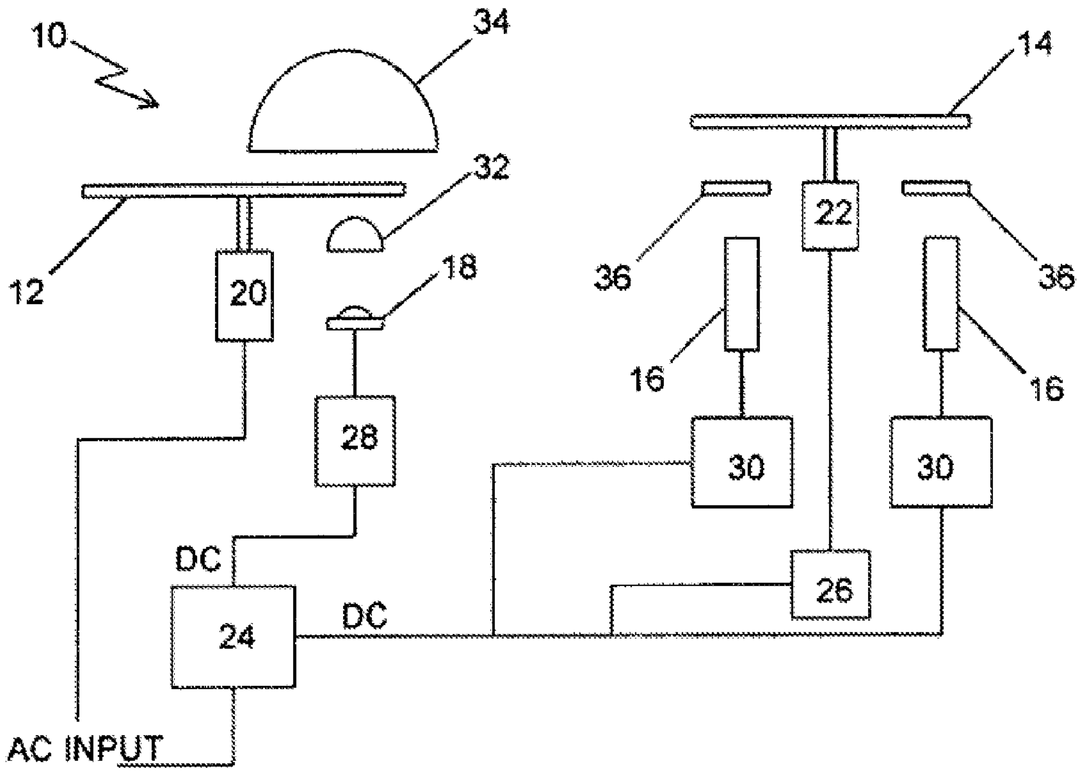
FIG. 1 Prior Art
FIG. 1 illustrates a circuit block diagram of a projection apparatus in the prior art.
Figure 2:
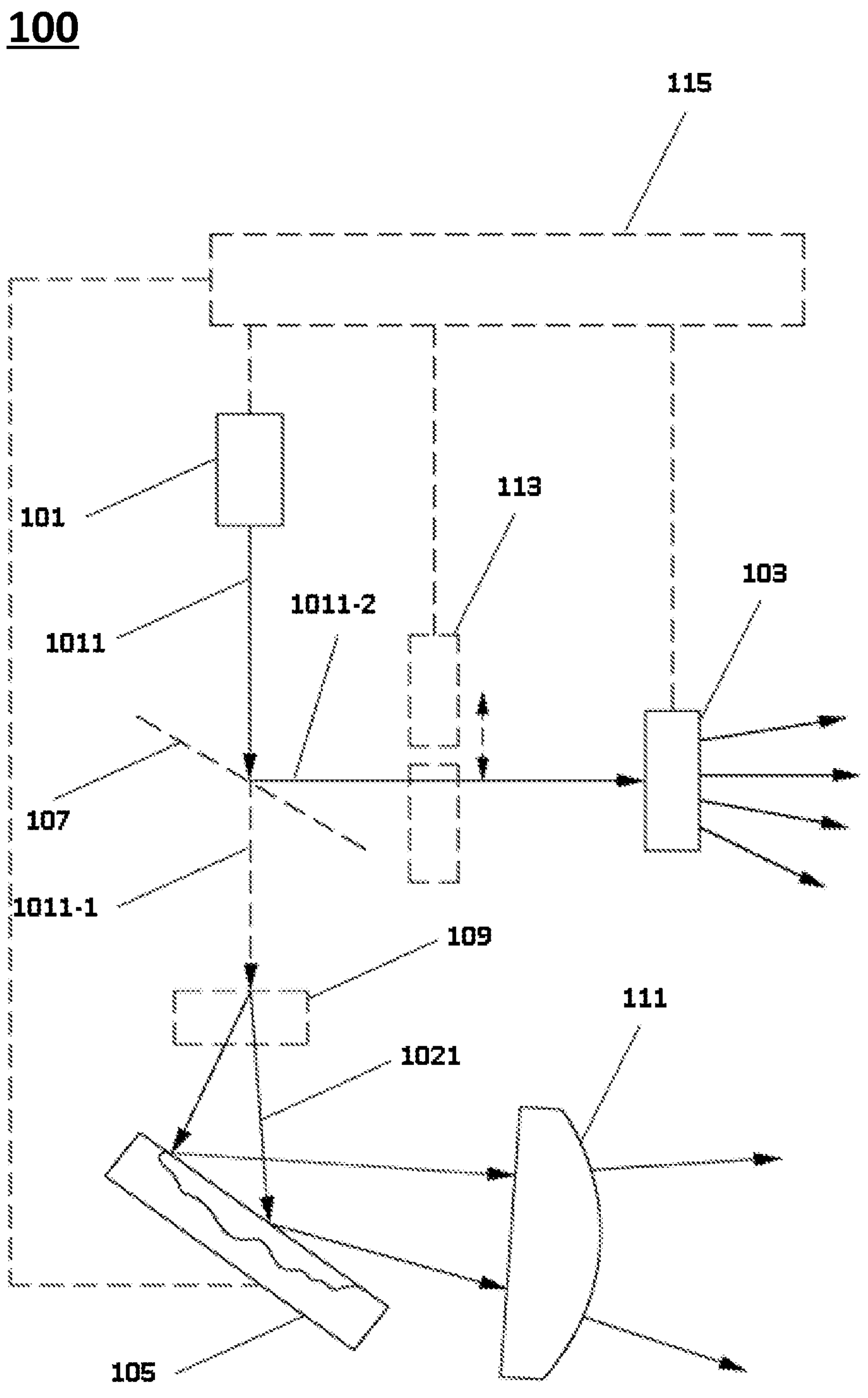
FIG. 2 illustrates a schematic diagram of a projection device according to a first exemplary embodiment of the disclosure.

According to the embodiments of the disclosure, there is provided a projection device. FIG. 2 illustrates a schematic diagram of a projection device according to a first exemplary embodiment of the disclosure.

As shown in FIG. 2, the projection device 100 includes a first light source 101, a diffraction part 103, and a reflection part 105. The first light source 101 emits a first light beam 1011. The diffraction part 103 is provided with first predetermined pattern, and is capable of diffracting at least a part of a first light beam 1011 emitted from the first light source 101 to form first patterns corresponding to the first predetermined patterns. The reflection part 105 is provided with one or more second predetermined patterns, and is capable of reflecting a second light beam 1021 incident thereon to form second pattern corresponding to one or more second predetermined patterns. One of the first pattern and the second pattern form projection pattern or both the first pattern and the second pattern are superposed to form projection pattern.

In this way, the reflection part 105 on which one or more second predetermined patterns are provided is configured to reflect the light beam to form the second pattern, thus the dispersion problem occurring when the light beam transmits through an optical component is avoided, and the formed projection pattern is clearer.

In the embodiment, the first light source 101 may be a coherent light source, such as laser.

In the embodiment, the diffraction part 103 may be a DOE, but the disclosure is not limited thereto, and any element capable of diffracting at least a part of the first light source 101 may be used as the diffraction part 103. The first predetermined pattern on the diffraction part 103 may be set according to intended projection pattern, for example, if the intended projection pattern is pattern suitable for setting off a Christmas atmosphere, the predetermined pattern on the diffraction part 103 may comprise a Christmas tree, a Santa Claus, or the like. The first predetermined pattern may be formed on the diffraction part 103 by photolithography.

The reflection part 105 may be made of any material capable of reflecting light including, but not limited to, a metal substrate, a glass substrate, or the like.

The second predetermined pattern on the reflection part 105 may be one or more, for example, a plurality of different second predetermined patterns may be formed in different areas of the reflection part 105, which may be set according to intended projection patterns, such as a cloud pattern, a silverwater pattern, a forest pattern and a park pattern. The number of the patterns may be set according to the size of the reflection part 105 and the size of the patterns.

The one or more second predetermined patterns on the reflection part 105 may also include different areas having different colors, e.g., red areas, green areas, blue areas, etc.

The one or more second predetermined patterns on the reflection part 105 may be formed by various means, for example, one or more holographic patterns may be formed on the reflection part 105 by holographic techniques, or one or more non-holographic patterns may be formed on the reflection part 105 by vacuum aluminizing on, for example, a Si substrate. The forgoing is merely some preferred examples of the manner of forming the second predetermined patterns on the reflection part 105, but the disclosure is not limited thereto, and any manner capable of forming the second predetermined patterns on the reflection part 105 is suitable for the disclosure.

In the embodiment, as shown in FIG. 2, the projection device 100 may further include a beam splitter 107 and a beam expander 109. The beam splitter 107 is disposed between the first light source 101 and the reflection part 105, and is configured to split a first light beam 1011 emitted from the first light source 101 into a first sub light beam 1011-1 and a second sub light beam 1011-2 incident to the diffraction part 103, and the diffraction part 103 diffracts the second sub light beam 1011-2 to form first pattern corresponding to the first predetermined pattern. The beam expander 109 is disposed between the beam splitter 107 and the reflection part 105 and configured to expand the first sub light beam 1011-1 to form a second light beam 1021.

In the embodiment, the first sub light beam 1011-1 is formed by that the beam splitter 107 transmits a part of light of the first light beam 1011, and the first sub light beam 1011-1 transmitting through the beam splitter 107 is incident on the beam expander 109. The second sub light beam 1011-2 is formed when the beam splitter 107 reflects the other part of light of the first light beam 1011, and the second sub light beam 1011-2 reflected through the beam splitter 107 is incident on the diffraction part 103.

In the embodiment, as shown in FIG. 2, the projection device 100 may further include a projection lens 111 configured to diverge the second light beam 1021 reflected from the reflection part 105 to form second pattern. The projection lens 111 may be a single-sided convex lens with one flat side and the other convex side, but the application is not limited thereto, and any lens that may diverge the reflected second light beam 1021 may be used as the projection lens 111.

In the embodiment, although not shown in FIG. 2, the projection device 100 may further include a first motor and a second motor. The first motor is connected to the reflection part 105, and configured to drive the reflection part 105 to rotate so that the second light beam 1021 is incident on the different second predetermined patterns on the reflection part 105 to produce different second pattern. The second motor is connected to the diffraction part 103, and configured to drive the diffraction part 103 to rotate so that the first predetermined pattern on the diffraction part 103 move in the projection pattern.

In the embodiment, optimally, the projection device 100 may further include a shutter 113, that may be disposed between the first light source 101 and the diffraction part 103, more specifically, disposed between the beam splitter 107 and the diffraction part 103, and configured to enable at least a part of the first light beam 1011 (namely, the second sub light beam 1011-2) emitted from the first light source 101 to be incident to the diffraction part 103 at a predetermined time interval. For example, when the intended projection pattern is starry sky pattern, an effect of flickering stars in the starry sky may be achieved by controlling the shutter 113 to enable the second sub light beam 1011-2 to be incident to the diffraction part 103 at a predetermined time interval. But the disclosure is not limited thereto, and the effect of flickering stars may be achieved by controlling the switching on/off frequency of the first light source 101 without providing the shutter 113.

In the embodiment, as shown in FIG. 2, the projection device 100 may further include a controller 115 in communication connection (e.g., wired or wireless connection) with the first light source 101, the diffraction part 103, the reflection part 105, the shutter 113, the first motor, the second motor, and the like and configured to control the parts. For example, the controller 115 may control the rotation speed and/or the rotation direction of the first motor and/or the second motor to control the rotation speed and/or the rotation direction of the reflection part 105 and/or the diffraction section 103, so that different projection patterns and projection effects are realized. If the projection device 100 includes the shutter 113, the controller 115 may also control the exposure time of the shutter 113 to realize different flickering effects of stars. The controller 115 may control the switching on/off frequency of the first light source 101 to achieve the effect of flickering stars without the shutter 113. The controller 115 may be implemented as a CPU, a processor, a motherboard, or the like.

In order to better understand the first exemplary embodiment according to the disclosure, how the projection device 100 according to the first exemplary example of the disclosure realizes these projection patterns will be described below with the projection patterns producing the starry sky/firefly park effect as an example.

Dot pattern is disposed on the diffraction part 103, and cloud pattern and park pattern are formed in two areas on the reflection part 105, respectively.

The controller drives the first motor to rotate the reflection part 105 to select the cloud pattern on the reflection part 105.

The first light source 101, which is laser, emits the first light beam 1011, and the first light beam 1011 is split by the beam splitter 107 into the first sub light beam 1011-1 and the second sub light beam 1011-2. The second sub light beam 1011-2 enters the diffraction part 103 through the shutter 113, and the second sub light beam 1011-2 is diffracted by the diffraction part 103 to form first pattern corresponding to the dot pattern provided on the diffraction part 103, which look like stars or fireflies. By controlling the exposure time of the shutter 113 by the controller 115, the stars or fireflies are enabled to have a flickering effect.

The first sub light beam 1011-1 is incident on the beam expander 109, and the beam expander 109 expands the first sub light beam 1011-1 to form the second light beam 1021. The second light beam 1021 is incident on the cloud pattern on the reflection part 105 and is reflected by the reflection part 105. The projection lens 111 diverges the second light beam reflected from the reflection part 105 to form the second pattern corresponding to the cloud pattern on the reflection part 105.

The first pattern, which looks like stars or fireflies, is superposed on the second pattern corresponding to the cloud pattern to from the starry sky effect.

The controller drives the first motor to rotate the reflection part 105, the park pattern on the reflection part 105 is selected, and the incident second light beam 1021 is reflected through the reflection part 105, so that second pattern corresponding to the park pattern is formed.

The first pattern, which looks like stars or fireflies, is superposed on the second pattern, which corresponds to the park pattern to from the firefly park effect.

Here, for simplicity, only the case where the projection device 100 may realize two scenes is described, but this is only an example, the disclosure is not limited thereto, and a plurality of patterns may be provided on the reflection part 105 as required to implement a plurality of different scenes.

Figure 3:
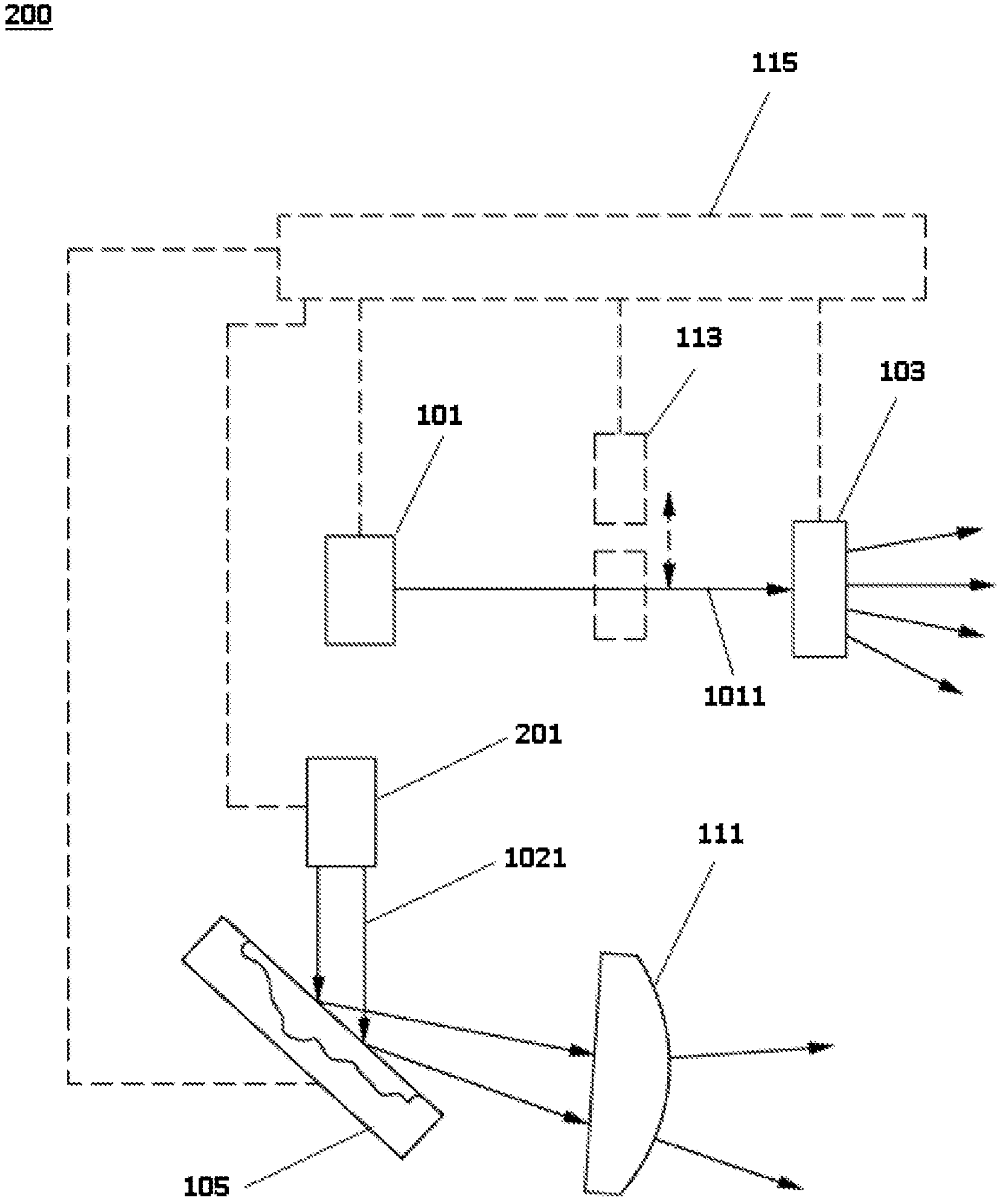
FIG. 3 illustrates a schematic diagram of a projection device according to a second exemplary embodiment of the disclosure.

FIG. 3 illustrates a schematic diagram of a projection device according to a second exemplary embodiment of the disclosure. The main difference between the projection device 200 according to the second exemplary embodiment of the disclosure and the projection device 100 according to the first exemplary embodiment of the disclosure is that in the projection device 200, a second light source 201 is additionally provided for the reflection part. In the following description of the projection device 200, the same components as the projection device 100 will be denoted with the same reference numerals, description will be made only with respect to differences between the projection device 200 and the projection device 100, and the configuration and operation of the same components of the projection device 200 and the projection device 100 may be referred to the description in combination with FIG. 2 and will not be repeated below.

As shown in FIG. 3, the projection device 200 may include a first light source 101, a second light source 201, a diffraction part 103, a reflection part 105, a projection lens 111, a shutter 113, and a controller 115, a first motor is connected to the reflection part 105 and configured to drive the reflection part 105 to rotate, a second motor is connected to the diffraction part 103 and configured to drive the diffraction part 103 to rotate, and the controller 115 may also control the second light source 201.

In the projection device 200, a first light beam 1011 emitted from the first light source 101 is diffracted by the diffraction part 103 to form first pattern corresponding to first predetermined pattern.

The light source 201 emits a second light beam 1021 which is reflected by the reflection part 105 to form second pattern corresponding to one or more second predetermined patterns.

The control part 115 may control light emission of the first light source 101 or the second light source 201 so that the projection pattern of the projection device 200 may be one or a superposition of both the first pattern and the second pattern, for example, the projection patterns may be only the first pattern, may be only the second pattern, or patterns formed by superposing the first pattern on the second pattern.

The second light source 201 may be a coherent light source or an incoherent light source.

When the second light source 201 is a coherent light source, the one or more second predetermined patterns on the reflection part 105 are one or more holographic patterns formed by holographic techniques. The controller 115 controls the first motor to drive the reflection part 105 to rotate, so that the coherent second light beam 1021 emitted from the second light source 201 is incident on different second predetermined patterns (holographic patterns) on the reflection part 105 to generate different second patterns.

When the second light source 201 is an incoherent light source, such as an RGB light source, the one or more second predetermined patterns on the reflection part 105 are one or more non-holographic patterns formed by vacuum aluminizing on, for example, a Si substrate. For example, the non-holographic pattern on the reflection part 105 may be one, images within certain spaced frames of a predetermined object (e.g., a small fish in the subsea world) are continuously formed on the non-holographic pattern, so that when the reflection part 105 rotates at a speed corresponding to the resolution of the human eye under the driving of the first motor, the small fish swimming in the subsea world is formed by the reflected second light beam 1021, and therefore, a dynamic effect of fish swimming in the subsea world is formed.

Figure 4:
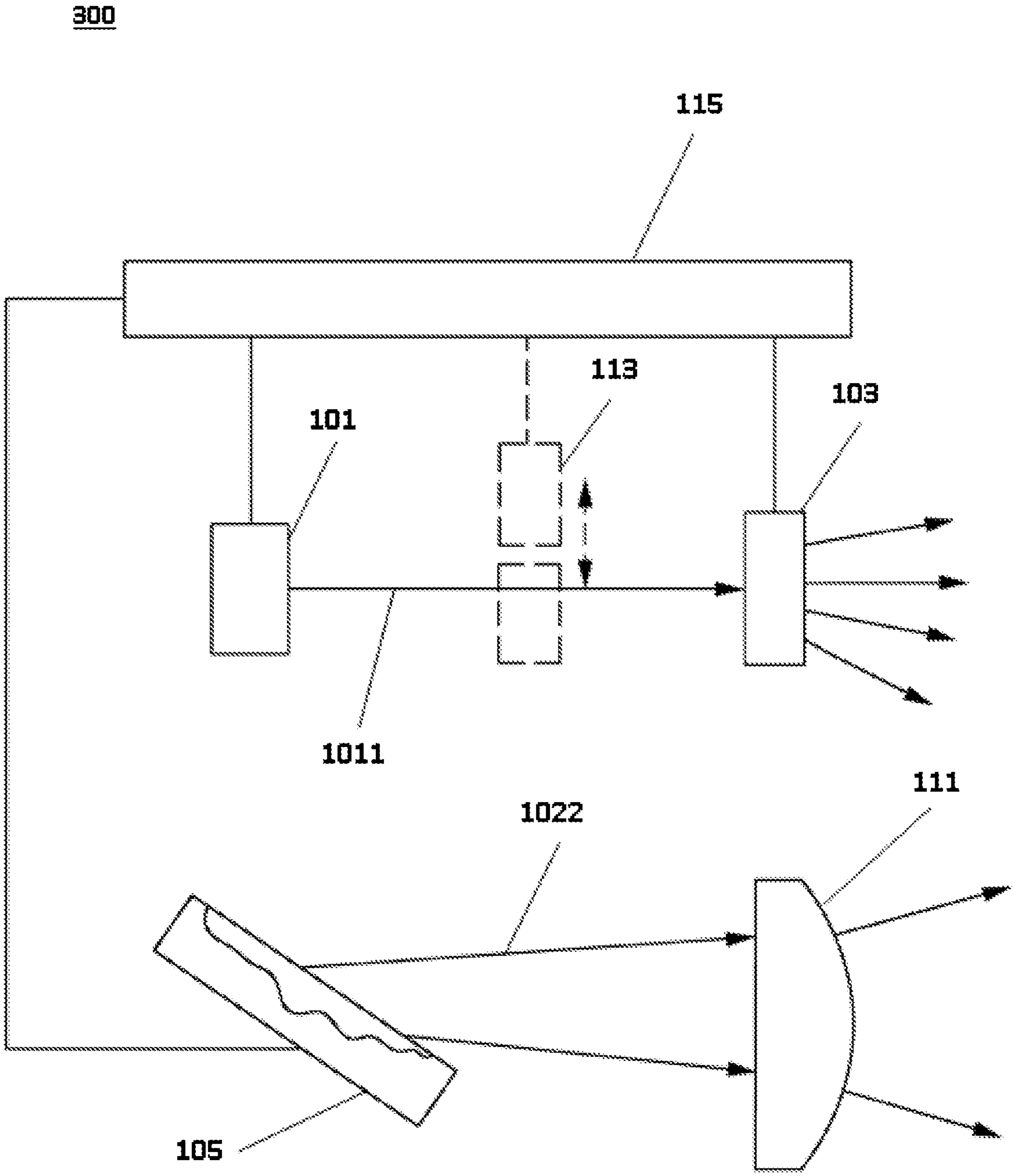
FIG. 4 illustrates a schematic diagram of a projection device according to a third exemplary embodiment of the disclosure.

FIG. 4 illustrates a schematic diagram of a projection device according to a third exemplary embodiment of the disclosure. The main difference between the projection device 300 according to the third exemplary embodiment of the disclosure and the projection device 100 according to the first exemplary embodiment of the disclosure is that in the projection device 300, a reflection part 105 is a self-luminous part and is not additionally provided with a light source. In the following description of the projection device 300, the same components as the projection device 100 will be denoted with the same reference numerals, description will be made only aiming at the differences between the projection device 300 and the projection device 100, and the configuration and operation of the same components of the projection device 300 and the projection device 100 may be referred to the description in combination with FIG. 2 and will not be repeated below.

As shown in FIG. 4, the projection device 300 includes a first light source 101, a diffraction part 103, a reflection part 105, a projection lens 111, a shutter 113, and a controller 115, a first motor is connected to the reflection part 105 and configured to drive the reflection part to rotate, and a second motor is connected to the diffraction part 103 and configured to drive the diffraction part 103 to rotate.

In the projection device 300, a first light beam 1011 emitted from the first light source 101 is diffracted by the diffraction part 103 to form first pattern corresponding to first predetermined pattern.

The reflection part 105 is a self-luminous component, for example, the reflection part 105 may include a self-luminous dot matrix composed of a plurality of Organic Light Emitting Diodes (OLEDs), each OLED being a self-luminous dot. But the disclosure is not limited thereto, for example, the reflection part 105 may also be a self-luminous dot matrix composed of a plurality of Quantum Light Emitting Diodes (QLEDs), each QLED being a self-luminous dot. It should be noted here that the self-luminous dot matrix of the reflection part 105 of the disclosure may include a novel dot matrix appearing in the future composed of any self-luminous elements.

The controller 115 may control the self-luminous dots in the self-luminous dot matrix of the reflection part 105 to form one or more second predetermined patterns through the self-luminous dots, and second pattern corresponding to the one or more second predetermined patterns is formed through self-luminescence of the self-luminous dots, forming one or more second predetermined patterns, of the reflection part 105. Specifically, the projection lens 111 diverges the light beam 1022 emitted by self-luminous dots, forming one or more second predetermined patterns, of the reflection part 105 to form second pattern.

The control part 115 may also control light emission of the first light source 101, so that the projection pattern of the projection device 300 may be one or a superposition of the first pattern and the second pattern, for example, the projection pattern may be only the first pattern, may be only the second pattern, or patterns formed by superposing the first pattern on the second pattern.

In the embodiment, since the second predetermined patterns on the reflection part 105 may be formed by controlling the self-luminous dots in the self-luminous dot matrix, the number and style of the second predetermined patterns may be increased, and the projection pattern may be set at will according to the requirements of users without replacing the reflection part 105, so that the design of the projection device is more flexible.

The projection device according to the first to third exemplary embodiments of the disclosure described above may be an atmosphere lamp.

Figure 5A:
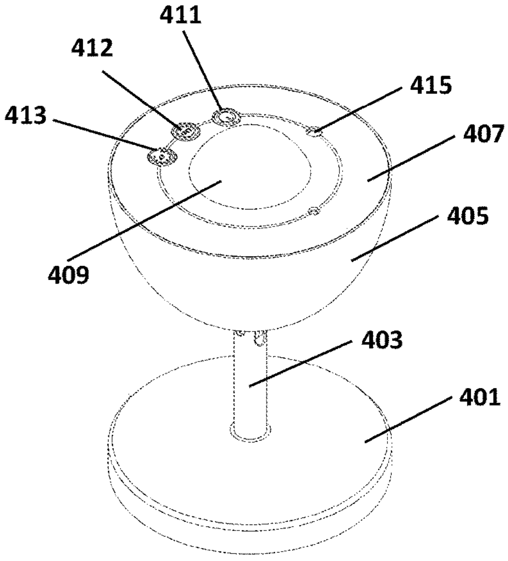
FIGS. 5A and 5B illustrate a structural schematic diagram of a projection system according to an exemplary embodiment of the disclosure.
Figure 5B:
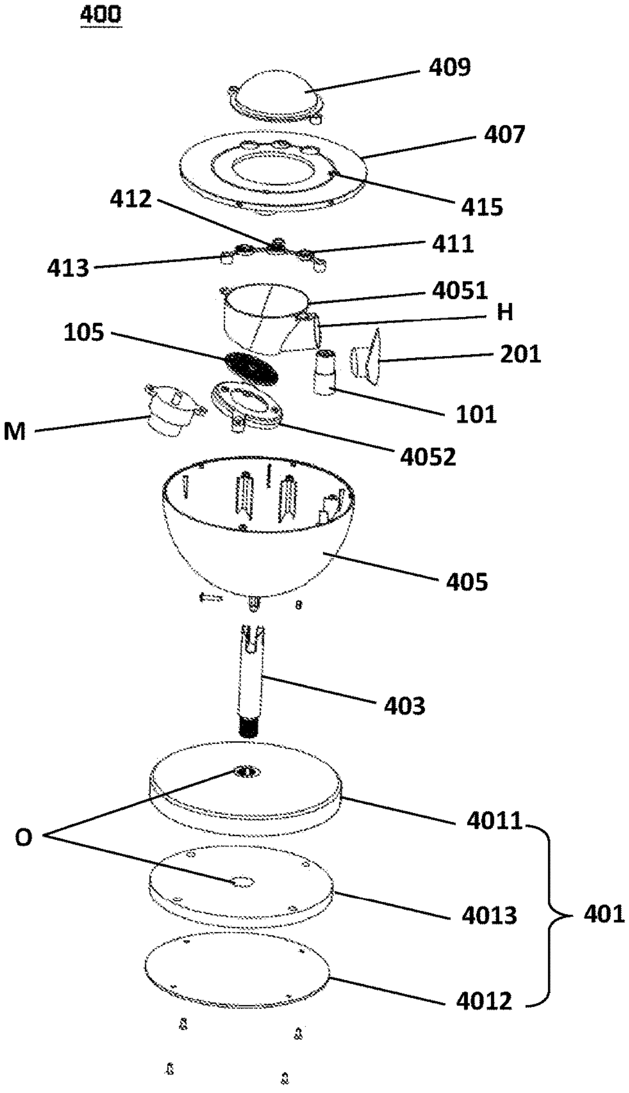

FIGS. 5A and 5B illustrate a structural schematic diagram of a projection system according to an exemplary embodiment of the disclosure. FIG. 5A is an overall appearance view of the projection system 400, and FIG. 5B is an exploded perspective view of the projection system 400.

As shown in FIGS. 5A and 5B, the projection system 400 includes: a housing; a projection device accommodated in the housing, which may be an atmosphere lamp; and control buttons disposed on the surface of the housing and may carry out control operations on the projection device. Here, the projection device is any one of the projection devices described above in combination with FIGS. 2-4, the specific configuration of which is not repeated here.

Specifically, as shown in FIGS. 5A and 5B, the projection system 400 includes, in order from bottom to top: a base 401, a support rod 403, a cup body 405, a face cover 407, and a projection lens 409.

The base 401 includes a base upper cover 4011, a base lower cover 4012, and a weighting disc 4013 disposed between the base upper cover 4011 and the base lower cover 4012 to increase the weight of the base. The base upper cover 4011, the base lower cover 4012 and the weighting disc 4013 are connected and combined into the base 401 through screws. The base upper cover 4011, the base lower cover 4012 and the weighting disc 4013 are in the same disc shape, and round holes O are formed in the corresponding center positions of the base upper cover 4011 and the weighting disc 4013.

The lower end of the support rod 403 is inserted into the round hole O provided in the center of the base 401.

The cup body 405 is configured to contain any of the projection devices described above in combination with FIGS. 2-4. For example, the first light source 101, the second light source 201, the first motor M and the reflection part 105 of the projection device 200 are supported in the cup body 405 in a configuration shown in FIG. 5B. A light passing part 4051 is disposed in the cup body 405 and is configured to limit the space of the second light beam emitted by the second light source 201 and improve the lighting effect. A fixing plate 4052 is also disposed in the cup body 405, between the first motor M and the reflection part 105, and is configured to fix the first motor M and the reflection part 105 to the bottom of the light passing part 4051. The second light beam emitted from the second light source 201 enters the light passing part 4051 through a hole H in the light passing part 4051 and is incident on the reflection part 105, and light reflected by the reflection part 105 is emitted from the top of the light passing part 4051. The second light source 201 is fixed inside bottom of cup body 405. The bottom of cup body 405 is connected with upper end of support rod 403 through bolts, so that the cup body 405 may rotate up and down or left and right around the support rod 403 in a pivoting mode, the angle of the cup body 405 is adjusted, and further, the angle of the projection device for projecting the pattern is adjusted.

The face cover 407 covers a cup opening of the cup body 405, and an opening corresponding to the top surface area of the light passing part 4051 in size is formed in the center of the face cover 407.

The projection lens 409 covers the opening of the face cover 407 to close the cup body 405.

At least one control button is disposed on the face cover 407 to control the operations on the projection device in the cup body 405, specifically, for example, as shown in FIG. 5B, the face cover 407 is further provided with three round holes, and the three control buttons 411, 412 and 413 are exposed from the corresponding three round holes of the face cover 407 when the face cover 407 covers the opening of the cup body 405. The button 411 is a power switch button for controlling the start and stop of the projection system 400, the button 412 is a color modulation button for selecting the color projected by the projection system 400, and the button 413 is a motor speed adjustment button for adjusting the rotation speed of the first motor or the second motor used in the projection device. Although three control buttons for switching control, color modulation control, and motor rotation speed control are shown here, the disclosure is not limited thereto, and the number and control functions of the buttons may be set according to user needs. In addition, in the disclosure, in addition to controlling the projection system 400 with the control buttons, a remote controller may be further provided for the projection system 400 to remotely control the projection system 400.

An open hole 415 is also provided on the face cover 407 adjacent to the projection lens 409, and the diffraction part 103 (not shown in FIG. 5B) covers the open hole 415 on the side, facing the cup body 405, of the face cover 407. A first light beam emitted from the first light source 101 is incident on the diffraction part 103 and exits through the open hole 415, thereby generating a first pattern. The first pattern is superimposed on a second pattern projected from the projection lens 409 to form a projection pattern.

The cup-shaped projection system of the disclosure is illustrated above by way of examples, but the disclosure is not limited thereto, and the projection system of the disclosure may be provided in any shape according to the preference of a user or the use occasion.

In the embodiments of the disclosure, the descriptions of the respective embodiments have respective emphasis, and for parts that are not described in detail in a certain embodiment, reference may be made to the related descriptions of other embodiments.

In the embodiments provided in the disclosure, it should be understood that the disclosed technical content can be implemented in other manners. The device embodiments described above are only exemplary, for example, division of the units is or modules is only logic function division, other division manners may be adopted during practical implementation, for example, multiple units or modules or components may be combined or integrated into another system, or some characteristics may be neglected or not executed.

The foregoing is merely preferred implementation modes of the disclosure, it should be noted that those of ordinary skill in the art can also make several modifications and improvements without departing from the principle of the disclosure, and these modifications and improvements all fall within the scope of protection of the disclosure.

What we claim is:

1. A projection device, comprising:

a first light source, which emits a first light beam;

a diffraction part, on which a first predetermined pattern is provided, and the diffraction part is capable of diffracting at least a part of the first light beam emitted from the first light source to form a first pattern corresponding to the first predetermined pattern;

a reflection part, on which one or more second predetermined patterns are provided, and the reflection part is capable of reflecting a second light beam incident thereon to form a second pattern corresponding to the one or more second predetermined patterns;

a beam splitter, disposed between the first light source and the reflection part and configured to split the first light beam emitted from the first light source into a first sub light beam and a second sub light beam incident to the diffraction part, wherein the diffraction part diffracts the second sub light beam to form the first pattern corresponding to the first predetermined pattern; and a beam expander, disposed between the beam splitter and the reflection part and configured to expand the first sub light beam to form the second light beam, wherein one of the first pattern and the second pattern forms a projection pattern or both of the first pattern and the second pattern are superposed to form the projection pattern.

2. The projection device according to claim 1, wherein the first light source is a coherent light source, and the one or more second predetermined patterns are holographic patterns.

3. The projection device according to claim 2, wherein the coherent light source is laser.

4. The projection device according to claim 2, wherein the diffraction part comprises a diffraction optical element.

5. The projection device according to claim 1, wherein the projection device further comprises:

a first motor, connected to the reflection part and configured to drive the reflection part to rotate, so that the second pattern rotate with the rotation of the reflection part.

6. The projection device according to claim 5, wherein the projection device further comprises:

a second motor, connected to the diffraction part and configured to drive the diffraction part to rotate.

7. The projection device according to claim 1, wherein the projection device further comprises:

a projection lens, configured to diverge the second light beam reflected from the reflection part to form the second pattern.

8. The projection device according to claim 1, wherein the projection device further comprises:

a shutter, disposed between the first light source and the diffraction part and configured to enable at least a part of the first light beam emitted from the first light source to be incident to the diffraction part at a predetermined time interval.

9. A projection system, comprising:

the projection device according to claim 1, wherein the projection device is an atmosphere lamp;

a housing, configured to accommodate the projection device; and control buttons, disposed on the surface of the housing, and being capable of carrying out control operations on the projection device.

* * * * *